W. H. LEAVITT.
TYING DEVICE FOR HAY BALES OR PACKAGES.
APPLICATION FILED DEC. 1, 1909.
970,065.
Patented Sept. 13, 1910.
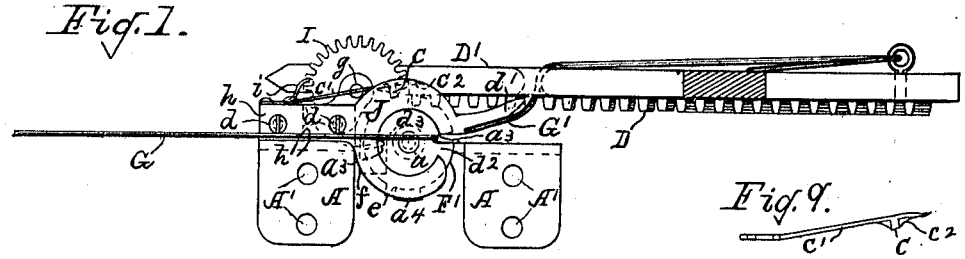
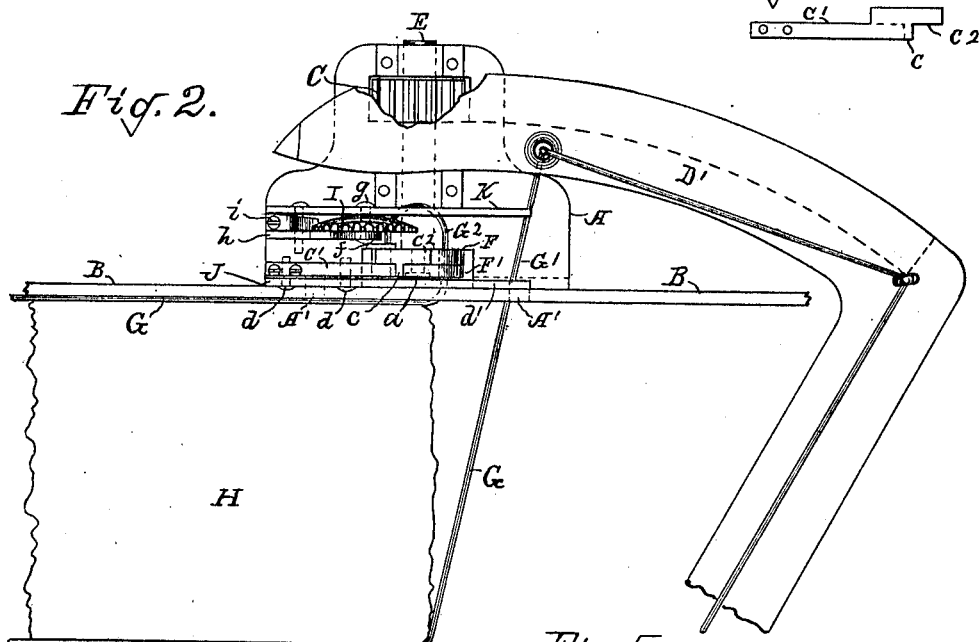
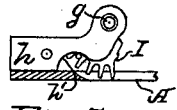
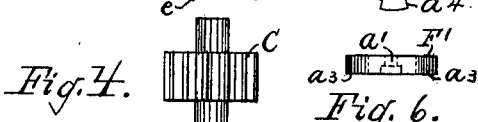
Witnesses
P. S. Sowell.
Milton Pattillo.
Inventor
William H. Leavitt.
By J. P. Dederick,
Attorney

UNITED STATES PATENT OFFICE.

WILLIAM H. LEAVITT, OF STAMFORD, TEXAS.

TYING DEVICE FOR HAY-BALES OR PACKAGES.

970,065.

Specification of Letters Patent. Patented Sept. 13, 1910.

Application filed December 1, 1909. Serial No. 530,886.

*To all whom it may concern:*

Be it known that I, WILLIAM H. LEAVITT, a citizen of the United States, residing at Stamford, in the county of Jones and State of Texas, have invented certain new and useful Improvements in Tying Devices for Hay-Bales or Packages, of which the following is a specification.

This invention pertains to mechanism for automatically binding bales or packages, and relates particularly to mechanism for use on hay presses; so the following description will be confined principally to its operation for that purpose.

The object of the present invention is to provide an efficient device, consisting of few parts, all of simple construction to automatically bind and tie hay bales by wire while passing through the press box in the process of baling.

In a former application filed by me on the 15th day of June, 1909, Serial No. 502,398, a tying device for hay bales or packages is shown and described, but the means for holding the ends of the wires while being twisted, and other features are thought not altogether perfect.

It is the object, therefore, of the present application to improve upon these features, besides having different means for holding the end of the wire extending to the spool, after it has been clipped from the portion forming the band about the bale.

The invention further relates to other details of construction, as will be pointed out in the specification and claims appended.

In the accompanying drawings, Figure 1 is an inner side elevation with the parts in the position they occupy after the wire has been laid about the bale, and before action of the wire twisting disks. Fig. 2 is a top plan view of the same, a portion of the needle being broken away. Fig. 3 is an end view in detail of a twister disk that is secured to the pinion shaft. Fig. 4 is a plan view of the disk, shaft, and pinion. Figs. 5 and 6 are respectively end and plan views of a clamping disk. Fig. 7 represents in detail a side elevation of my improved wire holder and releasing device therefor; showing a modification in the form and method thereof. Fig. 8 represents a guide for the wire to the twister disks; and it also acts as a guard for preventing the displacement of the wires while being twisted, and Figs. 9 and 10 show, respectively, an edge and a top view of a pawl or latch.

A is a frame, of metal, which supports the tying device, and is fastened to the side B of a hay baler by bolts passing through bolt holes $A^1$, in such a way as to present the cogs of the pinion C to be acted upon by cogs D, radially disposed on the lower side of the needle bar $D^1$. A shaft E passes laterally through the casting comprising frame A, in which it is suitably journaled. To its inner end is secured one, of a pair of annular disks F, and intermediately the pinion C; and through this pinion is imparted, at proper intervals, all the motions to the tying parts.

$F^1$ indicates a disk of the same diameter and thickness as that of F and is rotatably secured against the face of the latter by screw $a$ passing through a centrally located aperture $a^1$; in the disk F are notches $a^2$, and in disk $F^1$ similar notches $a^3$ for receiving and holding at proper intervals the ends of the wire band G that passes around the bale H as shown in Fig. 2; the end of this wire being there also shown held in one of a series of notches about the periphery of wire holder I and the parts in the position they occupy after the wire has been laid by the needle. Disk F revolves with the shaft E whenever actuated by the pinion C, it is provided with circular recesses $b$ extending nearly through from its outer face, in which recesses may be placed coiled springs or other frictional means that will press against the inner face of disk $F^1$, causing both to revolve in unison when disk F is not restrained. Disk $F^1$ has a segmental projection $a^4$ which contacts the downward projection $c$ on pawl $c^1$ bringing one of the notches $a^3$ in alinement with one of the notches $a^2$ of disks, the end of wire $G^2$ shown resting in one pair, and when the needle in advancing revolves the disks one half of a revolution the wire $G^2$ is carried around to the opposite side and the needle places wire $G^1$ in the other pair of notches, the continuous advance of the needle revolves the disks, bringing the projection $a^4$ in contact with pawl $c$ which retains disk $F^1$ while disk F continues to revolve a slight distance, causing them to grip the wire, when the projection $e$ passing under the curved portion $c^2$ of pawl which releases $F^1$ when they carry the wire $G^2$ against knife f which clips it loose from the end held in holder I. The wire G¹ in opposite slots has been carried around and into a holder notch, then against the knife, clipping it between holder and disks when the continuous revolutions of the disks twists the wire ends now held only by the disks, sufficiently to tie them. The needle having then completed its forward stroke starts on its return, revolving the disks in an opposite direction causing the pawl c to engage the opposite side of projection a⁴, holding it till again released by the projection e, freeing both ends of the tied wire about the bale, when the succeeding charges of hay, in forming another bale forces the bound bale from the press box. If two or more wires are to be placed about a bale, two or more needles D¹, and twisting devices would be required, all working in unison as set forth.

A guard J secured to the frame A by screws d has its inner face adjacent to the outer face of disk F¹, the outwardly inclined finger d¹ serves to deflect and conduct the wire from the needle, through an opening d² into the notches of the disks, and within a circular opening d³ of the guard; said opening being of less diameter than that of the disks serves to prevent accidental withdrawal of the wires while being twisted.

The wire holding and releasing device shown in detail in Fig. 7 consists of a circular disk I, convex on one side, the other flat, and provided all around its periphery with notches, the bottom of which are circular and slightly less width than the diameter of the wire they are intended to hold; but tapering outwardly to their extremities considerably wider; the disk turns freely on a centrally located pin g supported at one end by a plate K of the same shape as guard J with the part below dotted line in Fig. 8 removed. h, the other support shown in Fig. 7 serves also to release the short end of wire that has been clipped between the disks and holder; a succeeding end when delivered to a notch by the disks, revolves the holder sufficiently to carry it against the top surface of frame A which forces it securely in the notch, and carries the preceding piece against the curved part h¹ which forces it downward and out. A spring pawl i engaging the notches of the holder prevents turning in the wrong direction.

What I claim as new is—

1. A tying device for hay bales or packages, comprising a needle bar having cogs radially disposed on a portion of the lower side thereof, a journaled pinion arranged in a suitable frame work beneath and in the path of the toothed needle portion and rotated by the same, a disk secured to the inner end of the pinion shaft and a similar disk rotatably secured to its face, both provided with notches to receive and grip the wire band, as set forth.

2. The combination, in a tying device for hay bales or packages, of a rotary wire holder disk having wire receiving notches and provided with means to impart an intermittent, rotary movement thereto, a similar disk with corresponding notches rotatably secured against its face and provided with a segmental projection, a suitable pawl or stop coacting with said projection for causing the disks to alternately grip or release the wire, a guard adjacent to the face of the outer disk having an inclined projection extending to near the lower side of needle to carry the wire from the needle to the notches, said guard having a slot communicating with a circular recess that prevents the displacement of the wires while being twisted, substantially as described.

3. The combination of a pair of wire holding and twisting disks, one rigidly secured to the end of a pinion shaft, the other loosely pivoted on the face of the fixed disk, both provided with notches to receive the wire, and means permitting the movement of the former a slight distance while the latter remains stationary, causing them at intervals to grip and hold the wires and again to release them, a wire holder having a series of notches about its periphery arranged to receive and clamp the wire extending from the needle, a knife between the twisting disks and wire holder to cut the wire extending between them, permitting the disks to revolve and twist the ends held by them, and means for removing the preceding short end of wire left in the holder, substantially as herein described and shown.

In testimony whereof I affix my signature in presence of two witnesses.

WILLIAM H. LEAVITT.

Witnesses:
P. S. SOWELL,
MILTON PATTILLO.